United States Patent [19]
Otsubo et al.

[11] Patent Number: 6,081,496
[45] Date of Patent: Jun. 27, 2000

[54] OBJECTIVE LENS AND OPTICAL DISK DRIVING APPARATUS USING THE SAME

[75] Inventors: Yasuo Otsubo, Ibaragi-ken; Shigeru Hoshina; Hisao Kodama, both of Kanagawa-ken, all of Japan

[73] Assignee: Kabushiki Kaisha Toshiba, Kawasaki, Japan

[21] Appl. No.: 08/998,484

[22] Filed: Dec. 29, 1997

[30] Foreign Application Priority Data

Dec. 26, 1996 [JP] Japan .................................. 8-349057

[51] Int. Cl.⁷ ....................................................... G11B 7/12
[52] U.S. Cl. .................. 369/112; 369/44.12; 369/44.14; 369/44.22
[58] Field of Search ................................. 369/112, 44.14, 369/44.12, 44.15, 44.23, 44.16, 44.17, 44.18, 44.21, 44.22, 44.19

[56] References Cited

U.S. PATENT DOCUMENTS 5,295,122  3/1994  Murakami et al. ............. 369/44.15 X
5,881,042  3/1999  Knight ............................ 369/44.14 X

FOREIGN PATENT DOCUMENTS 5-82022  3/1992  Japan .

*Primary Examiner*—Muhammad Edun
*Attorney, Agent, or Firm*—Pillsbury Madison & Sutro LLP

[57] ABSTRACT

An objective lens for focusing a laser beam onto an optical information medium is disclosed. The objective lens comprises a lens body and a flange portion arranged on the periphery of the lens body. The surface of the lens body facing the optical information medium is formed with a convex shape having a radius of curvature R as follows: $0.05\ m < R < 0.5\ m$. In this way, a dynamic pressure is generated due to the convex-shaped surface and the rotation of the optical disk. This generates a buoyancy which overcomes the maximum acceleration of the objective lens. In this manner, it becomes possible to avoid collision of the objective lens with the optical information medium even in the presence of relative tilts, such as tangential tilts, radial tilts, and shift tilts, between the optical information medium and the objective lens.

30 Claims, 6 Drawing Sheets

OBJECTIVE LENS AND OPTICAL DISK DRIVING APPARATUS USING THE SAME

BACKGROUND OF THE INVENTION

1. Field of the Invention

This invention relates to an objective lens for focusing a laser beam onto an optical disk or other optical information recording medium, as well as relating to an optical disk driving apparatus using said objective lens.

2. Description of the Related Art

In an optical disk driving apparatus, a laser beam is irradiated onto a rotating (e.g., optical) information recording medium (optical disk) to record and reproduce information.

Here, the general term optical disk represents the various types of optical disks, such as for example, CD-ROMs, phase-change disks (PD), magneto-optical disks (MO), digital versatile disk (DVD), mini disks (MD) and other optical disks for recording and/or reproducing information.

The principal structural elements of the optical disk driving apparatus include an optical head driven, to move with respect to the optical disk, an optical source, represented by a laser diode etc., optical elements, such as the objective lens etc., and an optical detector that detects the laser beam guided by the aforementioned optical elements. Among these, the objective lens is used for focusing the laser beam to form a laser beam spot on the optical disk for both recording and reproducing information.

At present, having an application in both computers and AV (Audio & Video) equipment, the optical disk driving apparatus is required to be physically smaller and thinner. Consequently, efforts have been made to reduce the thickness of the optical head. However, there is a limit in reducing the thickness of the optical head. Studies are being conducted to investigate how to reduce the distance between the objective lens and the optical disk, that is, the so-called working distance (WD).

As the working distance WD is reduced, the laser beam diameter needed to form a laser beam spot with a prescribed size on the optical disk (i.e., the diameter of the laser beam exiting the objective lens) can be reduced. Thus, the optical system containing the objective lens can be used to reduce the WD which, in turn, can effectively reduce the thickness of the optical disk driving apparatus.

However, when the WD is reduced, the possibility of collision between the objective lens and the optical disk increases. That is, in order to correctly focus the laser beam onto the surface of the optical disk, positioning in the focusing direction with respect to the objective lens must be carefully controlled. It is important to note that external disturbances and many other factors can comprise focus-direction control. In such cases the chance that the objective lens collides with the optical disk increases as the WD decreases. Such collisions result in damping the objective lens, and the optical characteristics of the objective lens deteriorating.

Thus, as mentioned above, because of the danger of collision between the objective lens and the optical disk there is a problem with reducing the thickness of the optical head by reducing the WD.

The purpose of this invention is to provide a type of objective lens that functions to inhibit collision with the optical disk, or a type of objective lens that can ensure no degradation of the optical characteristics even in case of a collision with the optical disk. also the purpose of this nvention is to provide a type of optical disk driving apparatus that utilizes use of the aforementioned type of objective lens.

SUMMARY OF THE INVENTION

In order to solve the aforementioned problems, this Invention provides an objective lens for focusing a laser beam on an optical recording medium, comprising a first face facing the optical recording medium for generating a dynamic pressure when the objective lens comes near the optical recording medium due to rotation of the optical recording medium to prevent collision with the optical recording medium, and a second face opposite to said first face formed as a convex surface for permitting entrance of the laser beam.

In said objective lens, the first face is formed as for example a convex surface with a radius of curvature R of 0.2 m<R<0.5 m.

This invention further provides an objective lens for focusing a laser beam on an optical disk, comprising a lens portion for permitting entrance of the laser beam with an area facing the optical recording medium, and a flange portion arranged on a periphery of said lens portion formed as a convex surface, said flange portion is closer to the optical recording medium while rotating than said lens portion with the convex surface.

In said objective lens, a distance d in the optical axis direction between the position nearest the optical recording medium on said lens portion facing the optical recording medium and the position nearest the optical recording medium on the convex surface of said flange portion facing the optical recording medium is selected for example in the range of 5 $\mu$m<d<500 $\mu$m.

In said objective lens, the position nearest the optical recording medium on the convex surface of said flange portion facing the optical recording medium is displaced from the outer circumferential side to the inner circumferential side of said flange portion.

In said objective lens, the radius of curvature r of the convex surface of said flange portion is selected for example in the range of 0.02 m<r<0.5 m.

In order to solve the aforementioned problems, this invention also provides an objective lens driving apparatus for recording and/or reproducing information onto an optical recording medium, comprising, a disk rotating motor for rotating the optical recording medium during recording and/or reproducing information, an optical lens for focusing a laser beam on an optical recording medium, including a first face facing the optical recording medium for generating a dynamic pressure when the objective lens comes near the optical recording medium due to rotation of the optical recording medium to prevent collision with the optical recording medium, and a second face placed opposite side of said first face formed as a convex surface for permitting entrance of the laser beam, and an optical lens driving means for generating a driving force to said optical lens along an optical axis direction.

In said objective lens driving apparatus, the first face is formed as for example a convex surface with a radius of curvature R of 0.2 m<R<0.5 m.

This invention further provides an objective lens driving apparatus for recording and/or reproducing information onto an optical recording medium, comprising, a disk rotating motor for rotating the optical recording medium during recording and/or reproducing information, an optical lens for focusing a laser beam on an optical recording medium, includes a lens portion for permitting entrance of the laser beam with an area facing the optical recording medium, and a flange portion arranged on a periphery of said lens portion formed as a convex surface, said flange portion is closer to the optical recording medium while rotating than said lens portion with the convex surface, and an optical lens driving means for generating a driving force to said optical lens along an optical axis direction.

In said objective lens driving apparatus, a distance d in the optical axis direction between the position nearest the optical recording medium on said lens portion facing the optical recording medium and the position nearest the optical recording medium on the convex surface of said flange portion facing the optical recording medium is selected for example in the range of 5 μm<d<500 μm.

In said objective lens driving apparatus, the position nearest the optical recording medium on the convex surface of said flange portion facing the optical recording medium is displaced from the outer circumferential side to the inner circumferential side of said flange portion.

In said objective lens driving apparatus, the radius of curvature r of the convex surface of said flange portion is selected for example in the range of 0.02 m<r<0.5 m.

DETAILED DESCRIPTION OF THE PREFERRED EMBODIMENTS

In the following, this invention will be explained in more detail with reference to embodiments illustrated by figures.

Figure 1:
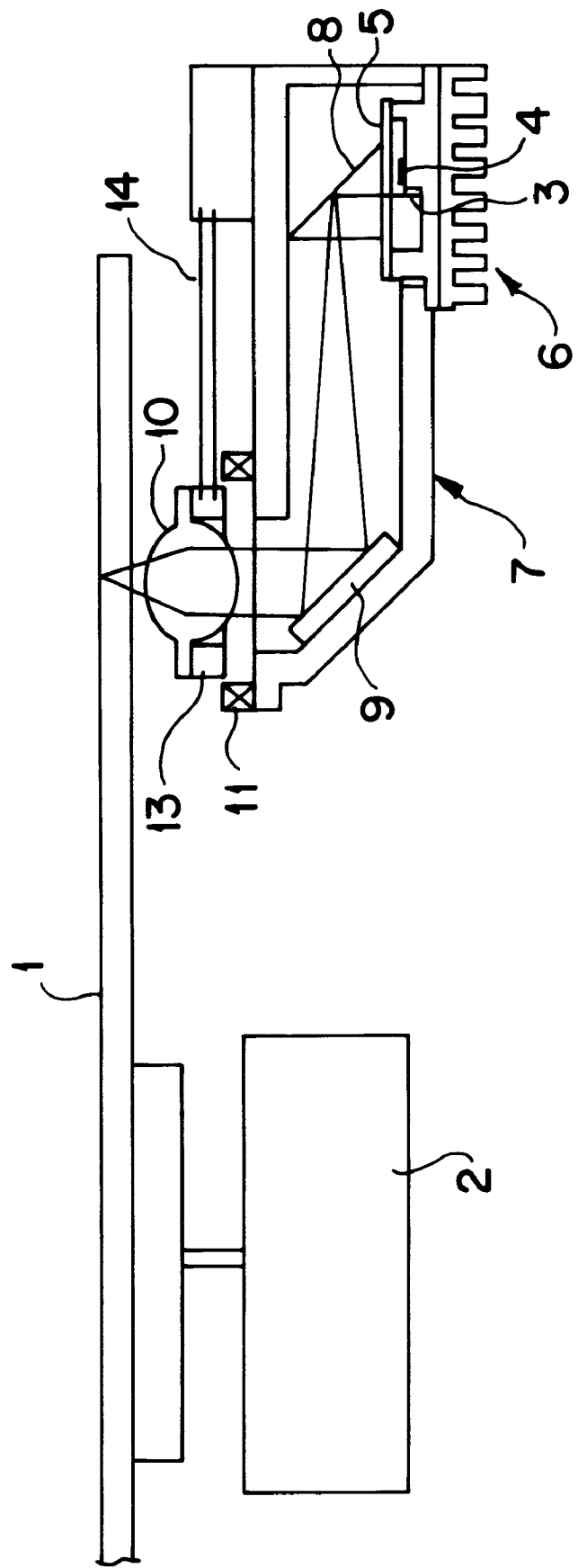
FIG. 1 is a cross-sectional view schematically illustrating the optical disk driving apparatus in an embodiment of this invention.
Figure 2:
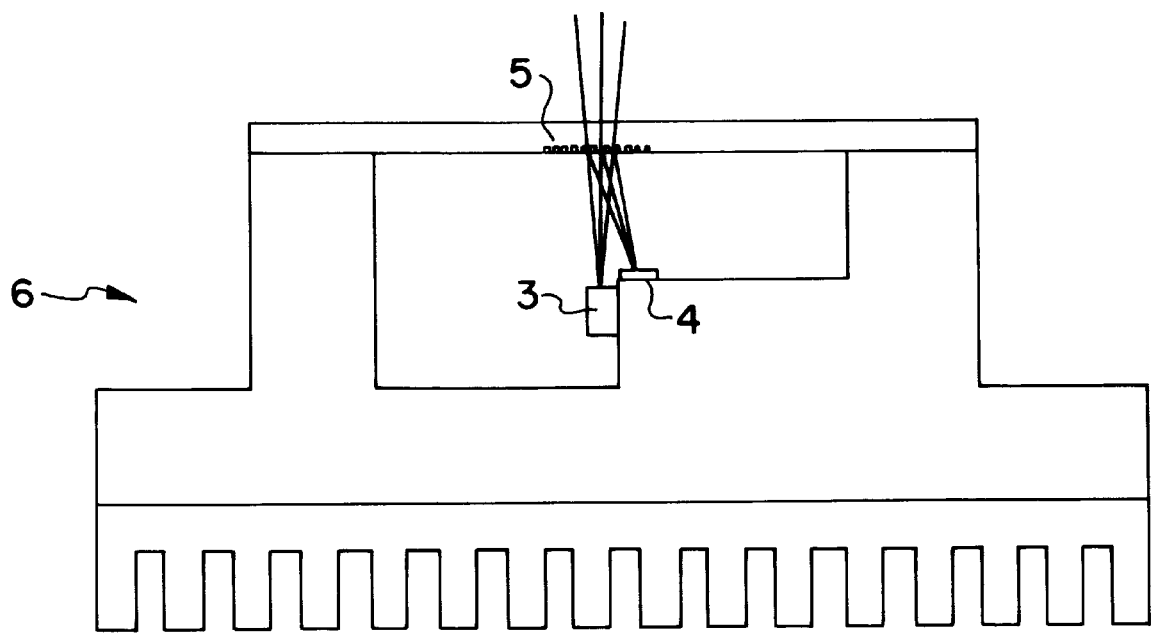
FIG. 2 is a cross-sectional view illustrating in detail the optical unit shown in FIG. 1.
Figure 3:
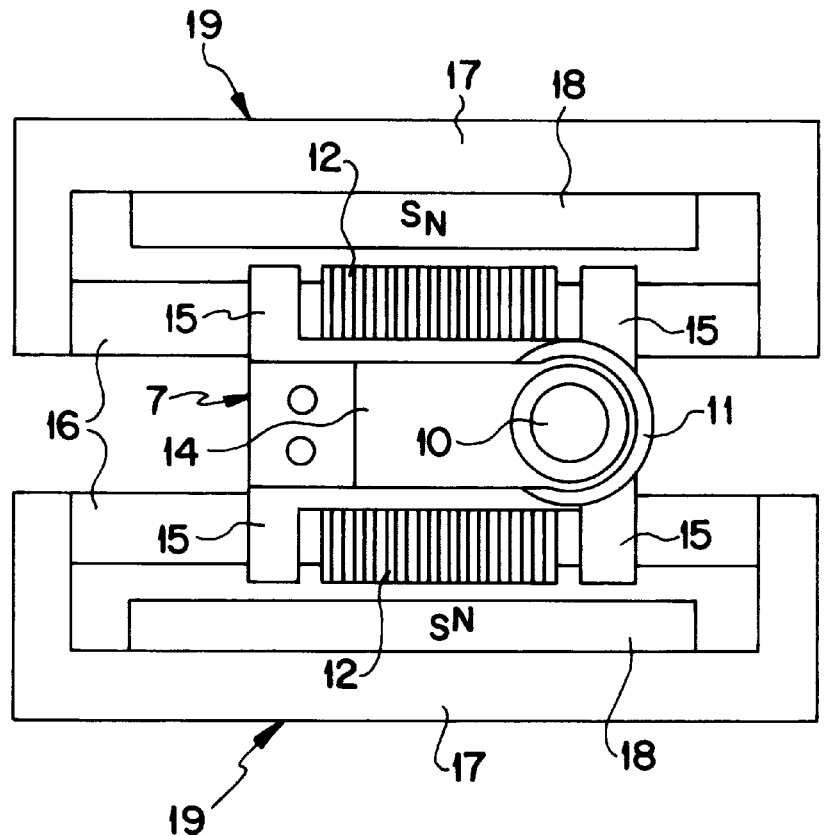
FIG. 3 is a plane diagram illustrating in detail the constitution of the driving system containing the optical head in FIG. 1.
Figure 4:
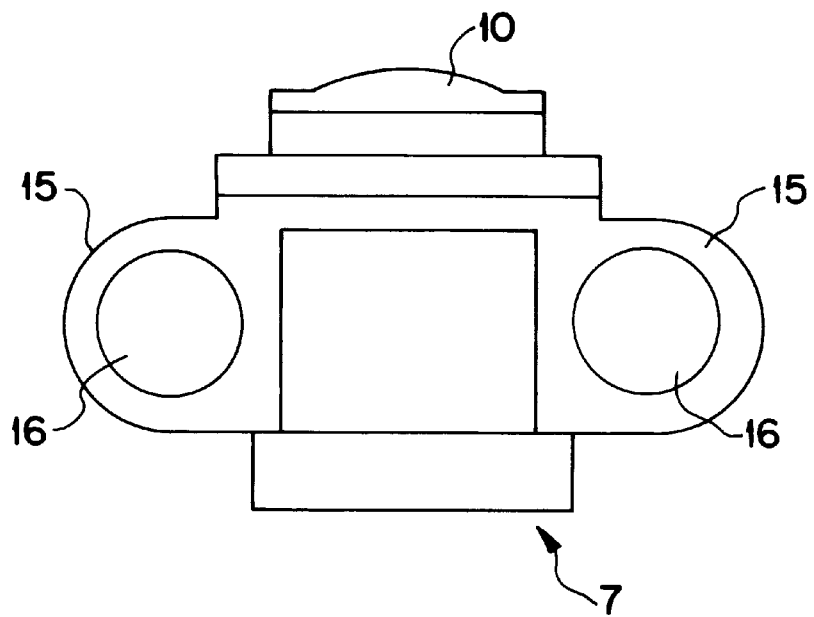
FIG. 4 is a cross-sectional view illustrating in detail the constitution of the optical head in FIG. 1.

The, the overall constitution of the optical disk driving apparatus in this embodiment will be explained with reference to FIGS. 1–4. Here, FIG. 1 is a cross-sectional view schematically illustrating the optical disk driving apparatus in this embodiment of the invention. FIG. 2 is a cross-sectional view illustrating in detail the optical unit. FIG. 3 is a plane diagram illustrating the constitution of the driving system containing the optical head. FIG. 4 is a cross-sectional view of the optical head.

An optical disk 1 refers to the various types of optical disks, such as a CD-ROM (Compact Disk Read Only Memory) PD (phase-change disk), MO (magneto-optical disk) etc. used for recording and/or reproducing information. The optical disk 1 is held by a magnetic chuck, or other chucking mechanism on a spindle motor 2 fixed on a base (not shown in the figure), and rotated by the spindle motor 2 during recording and/or reproducing information.

FIG. 2 illustrates in detail the configuration of the optical unit. An optical unit 6 comprises a laser diode 3, which forms the laser beam for irradiating the optical disk 1, an optical detector 4, and a HOE (Holographic Optical Element) 5. The optical unit 6 is fixed on the lower portion of the optical head 7. On the lower surface of the optical unit 6, multiple bumps/dips for improving the heat radiation property are formed.

As indicated in FIG. 1, the laser beam emitted by the laser diode 3 passes through HOE element 5 and is incident on a prism 8, which changes its direction by 90 degrees. The beam direction changed again by 90 degrees by an upward mirror 9 so that it is incident on an objective lens 10 set in the upper portion of the optical head 7. By means of this objective lens 10, the laser beam is focused onto a minute focal spot on the recording surface of the optical disk 1.

The laser beam reflected from optical disk 1 is incident on HOE element 5 through the objective lens 10, the upward mirror 9, and the prism 8. It is then deflected by HOE element 5 and is incident on an optical detector 4. The optical detector 4 is a multi-divided detector whose face is divided into multiple detecting regions. The output signal of each detecting region is processed by an operation circuit (not shown in the figure), forming a reproducing information signal, focus error signal, and tracking error signal corresponding to the information recorded on the optical disk 1.

In order to correct for the position deviation in the focusing direction of the objective lens 10, based on the focus error signal, focus servo control is performed as a current flows from a focus servo circuit (not shown in the figure), into a focusing coil 11 shown in FIG. 3. Similarly, in order to correct for the position deviation in the tracking direction of the objective lens 10, based on the tracking error signal, the tracking control is performed as a voltage is applied from a tracking servo circuit (not shown in the figure), on a linear motor coil 12 and the upward mirror 9 as shown in FIG. 3.

As depicted in Fig 1, the objective lens 10 is held by an objective lens holder 13, made up of a plastic magnet for example. One end of supporting wires 14, made of 4 pieces of a nonmagnetic material, is fixed on the objective lens holder 10; the other end of the supporting wires 14 is fixed on the optical head 7. In this way, the objective lens 10 is allowed to move in the optical axis direction. As a current flows in focusing coil 11, fixed on the optical head 7, an electromagnetic action takes place between the current and the generating magnetic field of the objective lens holder 13 made of a magnet, producing a driving force in the optical axis direction, that is, focusing direction, with respect to the objective lens 10.

In one embodiment, single wire 14 may be used to allow the lens 10 to tilt relative to the optical disk 1. The single wire provides more degrees of freedom than the four wires 14.

As shown in FIG. 3, the linear motor coil 12 is formed in a cylindrical shape. On each of the two side surfaces of the optical head 7, a linear motor coil is formed. In the optical head 7, a total of four sliding bearings 15 are formed on the two sides to hold the linear motor coil 12. Two guide shafts 16 formed along the radial direction of the optical disk 1 are engaged to said bearings, respectively. In this way, the optical head 7 can move in the radial direction of optical disk 1.

The guide shafts 16 are made of a magnetic material, which acts as the yoke of the magnetic circuit. U-shaped back yokes 17 are fixed on the two sides of the guide shaft 16. Also, radial magnets 18 are arranged and fixed on the back yokes 17 at a position facing the linear motor 12, with a magnetic gap held between them. A radial magnetic circuit is formed from the guide shaft 16, back yoke 17, and the radial magnet 18. This radial magnetic circuit has its magnetic field acting on the linear motor coil 12 and, due to the electromagnetic action with the current flowing in the linear motor coil 12, a driving force is generated on the optical head 7 in the radial direction of the optical disk 1.

The following, a detailed explanation of the objective lens 10 of this invention.

In at least a portion of its surface facing the optical disk 1, the objective lens 10 has a dynamic-pressure generating surface that generates a dynamic pressure (i.e., repulsive force) due to the rotation of the optical disk 1 such a repulsive force act to prevent collision between the optical disk 1 and the objective lens 10 when the objective lens comes near the optical disk 1.

The optical disk drive may control the position of the objective lens 10 so that the optical lens 10 floats above the optical disk 1 in the normal, focused position. Thus, the dynamic pressure can both prevent collision and also support the objective lens 10 during normal operation. The current in the focusing coil 11, for example, can be adjusted to achieve a floating objective lens 10 accurately.

Figure 5:
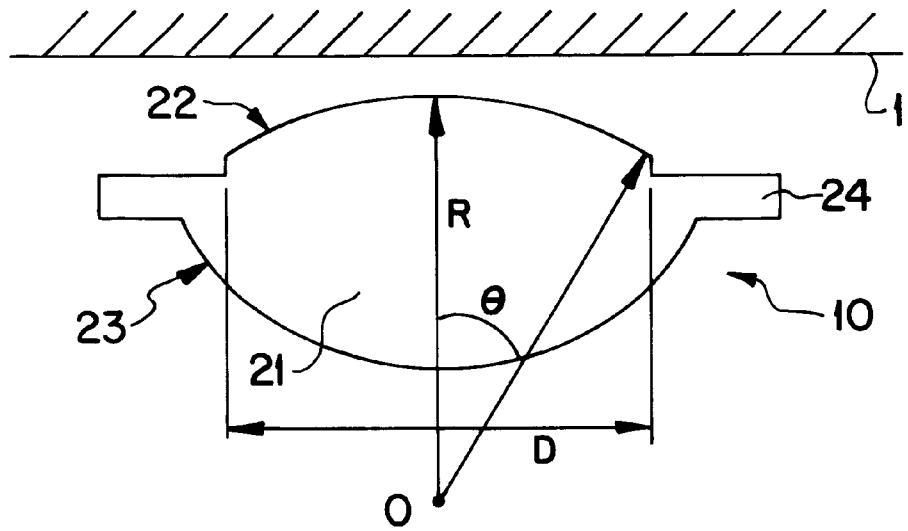
FIG. 5 is a cross-sectional view illustrating the constitution of the objective lens relates to the first embodiment of this invention.

FIG. 5 is a diagram illustrating a first embodiment of the objective lens 10, where the dynamic-pressure generating surface is formed. In FIG. 5, for lens body 21 of the objective lens 10, the surface facing the optical disk 1, (disk-facing surface 22) has a convex shape with a radius of curvature R larger than that of the surface on the opposite side surface incident surface 23 in which the laser beam exiting laser diode 3 is incident. The optical focusing characteristics of the objective lens 10 depend on the refractive index of the material that forms the lens body 21, the shape (i.e., distribution of curvature) of the incident surface 23, and the shape of disk-facing surface 22 of the lens body 21. If the shape of the incident surface 23 is formed appropriately independent of the shape of the disk-facing surface 22 of the lens body 21, the desired focusing characteristics can be realized. Consequently, there is no problem even when the disk-facing surface 22 has a large radius of curvature.

On the periphery of the lens body 21 a flat plate-shaped flange portion 24 is formed which is integrated with the lens body 21. As such, the flange portion 24 is held by the objective lens holder 13.

The objective lens 10 may be of any suitable material, such as, for example, glass, plastic, or molded plastic.

In this embodiment, by selecting the radius of curvature R of the disk-facing surface 22 within the range of 0.2 m<R<0.5 m, the disk-facing surface 22 is capable of functioning as a dynamic-pressure generating surface, and can, thus, prevents collisions between the optical disk 1 and the objective lens 10.

Figure 6:
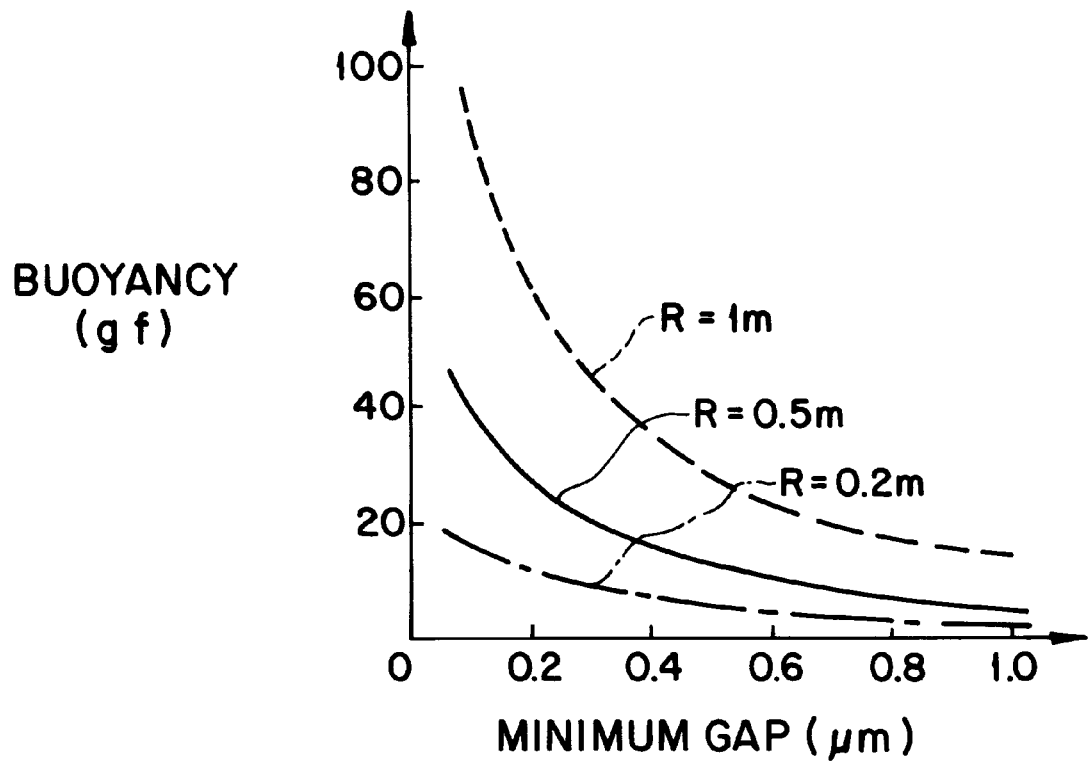
FIG. 6 is a diagram illustrating the relationship of the minimum gap between the surface of the objective lens in said first embodiment facing the optical disk and the optical disk itself versus the buoyancy of the objective lens, with the radius of curvature of the surface of the objective lens facing the optical disk as a parameter.

FIG. 6. illustrates the relationship of the minimum gap between the optical disk 1 and the objective lens 10, and the buoyancy (i.e., dynamic pressure) generated by the objective lens 10 with respect to the optical disk 1. This relationship is parameterize against the radius of curvature R of the disk-facing surface 22 of the lens body 21.

The mass of the movable portion containing the objective lens 10 is usually about 0.5 g. In consideration of the maximum acceleration (e.g., 20 G) applied to the objective lens 10, the buoyancy of the objective lens 1, needed to prevent collision with the objective lens 10 becomes 10 gf. Here, the minimum gap between the optical disk 1 and the objective lens 10 depends on the surface roughness of the optical disk 1 where the maximum height of the surface roughness is about 0.3 $\mu$m. It is determined from FIG. 6 that in order to generate a buoyancy of 10 gf to overcome the maximum acceleration of the disk-facing surface 22, radius of curvature may be R>0.2 m.

Accompanying rotation, the optical disk 1 exhibits a tilt in the circumferential direction (i.e., tangential tilt) and a tilt in the radial direction (i.e., radial tilt). The magnitudes of these tilts are up to about 7 mrad for DVD (Digital Versatile Disk) currently being developed. Also, when the optical head 7 moves in the radial direction (i.e., tracking direction) of the optical disk 1, or when the objective lens 10 moves in the focusing direction, a tilt (i.e., shift tilt) up to about 2 mrad may occur on the optical axis of the objective lens 10. Consequently, an overall relative tilt of 9 mrad takes place between the two.

In order to avoid collision between the objective lens 10 and the optical disk 1 for the minimum gap of 0.3 $\mu$m between the optical disk 1 and the objective lens 10, even in case of the aforementioned relative tilt between the optical disk 1 and the objective lens 10, it is necessary to take the following measures.

Suppose that the effective diameter of the lens body 21, as shown in FIG. 5, is D. Such an effective diameter gives rise to the following relationship:

$$(D/2)/R = \sin\theta$$

Because, for this case $\theta \ll 1$, (i.e., since $\theta$ is sufficiently small value), $\sin\theta$ is nearly equal to $\tan\theta$, and they are both nearly equal to $\theta$. Consequently, the relationship becomes: $(D/2)/R > \theta = (9+\alpha)$mrad Here, $\alpha$ represents the margin. In consideration of the assembly precision of the optical head and the spindle motor that rotates the optical disk, when the adjustment operation is carried out, it is necessary to ensure that the value of $\alpha$ is at least 1 mrad.

$$D/2R > 10^{-2} R < 50D$$

Usually, since diameter D is at most 10 mm, R<0.5 m. That is, the value of R should be selected smaller than 0.5 m (=500 mm).

In this embodiment, by selecting the radius of curvature R of the disk-facing surface 22 to be within the range of 0.2 m<R<0.5 m, it is possible to have the disk-facing surface 22 function as a dynamic-pressure generating surface to prevent collision between the optical disk 1 and the objective lens 10. By means of the disk-facing surface 22, a buoyancy that overcomes the maximum acceleration is generated. As such, no collision can take place between the objective lens 10 and the optical disk 1 even in the presence of a relative tilt between the optical disk and the objective lens (i.e., tangential tilt, radial tilt, and shift tilt).

Figure 7:
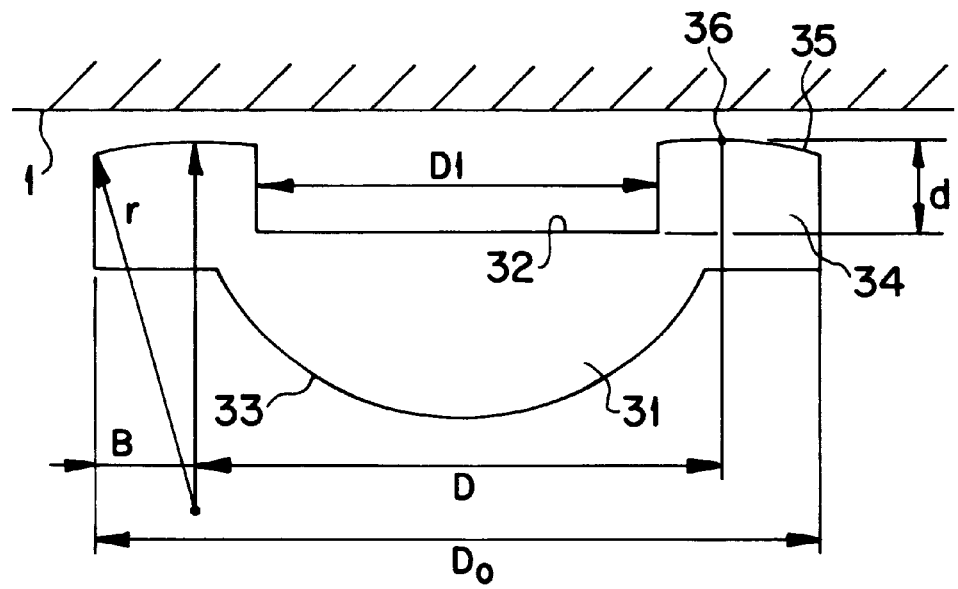
FIG. 7 is a cross-sectional view illustrating the constitution of the objective lens in the second embodiment of this invention.

FIG. 7 is a diagram illustrating a second embodiment of the objective lens 10 with a dynamic-pressure generating surface. As shown in FIG. 7, for a lens body 31, a lens surface 32 facing the optical disk 1 (disk facing surface) is a nearly flat surface. On the other hand, the surface on the opposite side, that is, incident surface 33, on which the laser beam exiting from the laser diode 3 is incident, is a convex surface having a prescribed distribution of curvature.

As stated above, the focusing characteristics of the objective lens 10 depends on the refractive index of the material that forms the lens body 31, the shape (distribution of curvature) of the incident surface 33, and the shape of the disk-facing surface 32. However, as long as the incident surface 33 is formed in an appropriate shape independent of the shape of the disk-facing surface 32, the necessary focusing characteristics can be realized. Consequently, even when the disk-facing surface 32 of the lens body 31 is formed in a flat shape, there is no problem in achieving the desired dynamic pressure generating properties.

On the periphery of the lens body 31, a flange portion 34, having a flat portion on the same side as light reflective surface 33, is formed integrated with the lens body 31. The flat other surface portion of the flange portion 34, is held in the objective lens holder 13.

In this embodiment, the surface of the flange portion 34 faces the optical disk 1 (i.e., disk-facing surface 35), forms a convex surface projecting to the side of the optical disk 1 from the disk-facing surface 32. The disk-facing surface 35 in a convex shape functions as a dynamic pressure generating surface, just as the aforementioned first embodiment.

In this case, distance d in the optical axis direction between the position nearest optical disk 1 on the disk-facing surface 32 and a position 36 nearest the optical disk 1 on the disk-facing surface 35 of the flange portion 34 is selected in the range of 5 $\mu$m<d<500 $\mu$m.

Moreover, the nearest position 36 of the optical disk 1 on the disk-facing surface 35, of the flange portion 34 is displaced from the outer circumferential side to the inner circumferential side of the disk-facing surface 35 as shown in FIG. 7. In other words, supposing that the flange portion 34 has an inner diameter of Di and an outer diameter of Do, and the diameter of the nearest position 36 is Dm, the relationship of (Di+Do)/2>Dm should be met.

In addition, radius of curvature r of the disk-facing surface 35 of the flange portion 34 is selected to meet the relationship of 0.02 m<r<0.5 m.

With this configuration, it is possible to have the disk-facing surface 35 of the flange portion 34 function effectively as the dynamic-pressure generating surface in preventing collision between the optical disk 1 and the objective lens 10. The, the reason for this function will be specifically explained with reference to FIGS. 8, 9, and 10 as follows.

Figure 8:
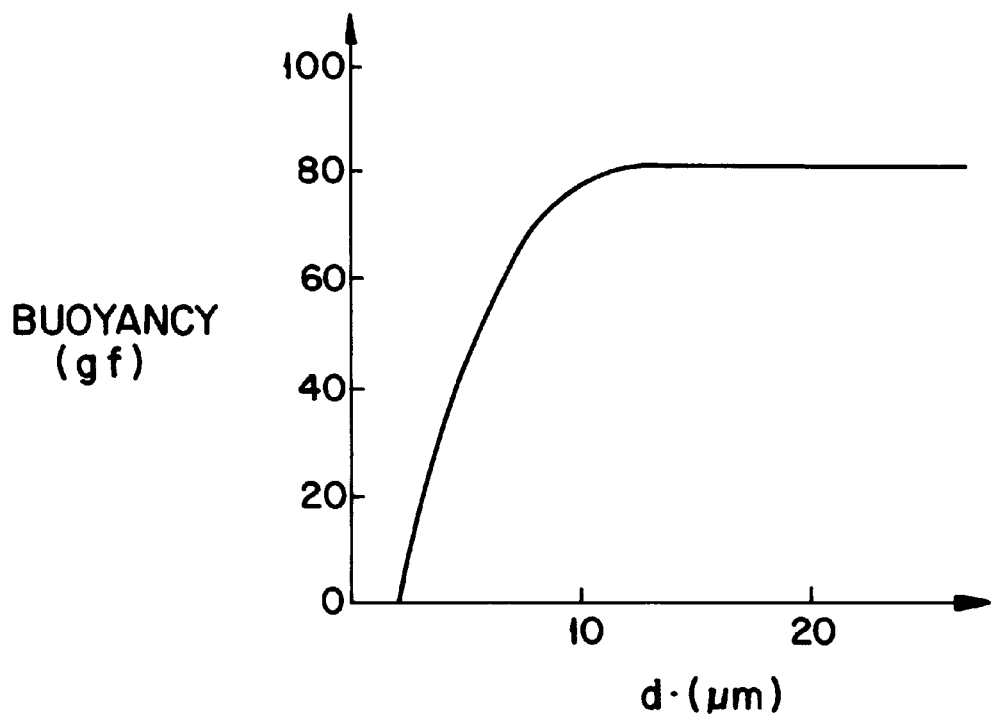
FIG. 8 is a diagram illustrating the relationship between the distance along the optical axis between the position nearest the optical disk on the surface of the lens body facing the optical disk and the position nearest the optical disk on the surface of the flange portion facing the optical disk versus the buoyancy of the objective lens in the second embodiment of this invention.

FIG. 8 illustrates the relationship of distance d in the optical axis direction, between a position nearest the optical disk 1 of the disk-facing surface 32 and the nearest position 36 of the flange portion 34 and the buoyancy generated by the objective lens 10 with respect to the optical disk 1.

When distance d is small, the gap between the disk-facing surface 32 and the optical disk 1 can be reduced. Consequently, this is beneficial for reducing working distance WD. However, if distance d is too small, for the gap between the optical disk 1 and the objective lens 10, with respect to the rotating direction of the optical disk 1, a wedge-like tapered space is formed. In the portion where the wedge-like space is formed a pressure (i.e., negative pressure) that pulls the objective lens 10 to the optical disk 1, is generated. This negative pressure deteriorates the generation of the positive buoyancy needed for preventing the collision of the objective lens 10 and the optical disk 1. At the same time, dust may be deposited near the negative-pressure generating portion, which may lead to degradation of the optical characteristics of the objective lens 10.

In FIG. 8, the buoyancy decreases in the region where distance d is small. It is believed that this is due to generation of the negative pressure. In fact, if distanced d larger than 10 nm. negative pressure becomes negligibly small. If distance d is larger than 10 $\mu$m, the negative pressure becomes negligibly small. Thus, to ensure the necessary buoyancy, it is preferred that the distance d be set to 5 $\mu$m or larger when the negative pressure becomes half of the positive pressure.

On the other hand, if distance d is too large, the total thickness of the objective lens 10 containing the flange portion 34 becomes larger, and it becomes senseless to reduce working distance WD to decrease the thickness of the optical disk driving apparatus. From this point of view, it is appropriate to have a distance d of 500 $\mu$m or smaller.

Figure 9:
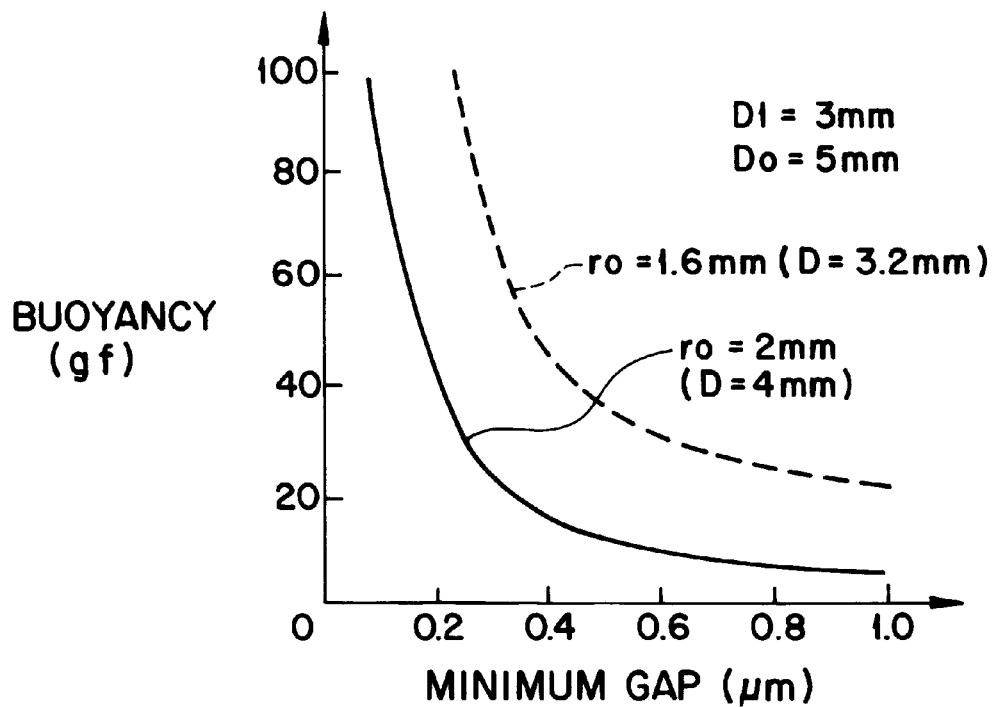
FIG. 9 is a diagram illustrating the relationship between the minimum gap between the surface of the flange portion facing the optical disk and the optical disk itself versus the buoyancy of the objective lens, with the radius of the position nearest the optical disk on the surface of the flange portion facing the optical disk taken as a parameter, for the objective lens in the second embodiment.

FIG. 9 illustrates the relationship of the minimum gap of the optical disk 1 and the objective lens 10, and the buoyancy generated by the objective lens 10 with respect to the optical disk 1. The relationship is parameterized against the radius rm (or diameter Dm) of the nearest position 36 for determining the optimum nearest position 36 of the flange portion 34. In this example, the flange portion 34 has inner diameter Di of 3 mm and outer diameter Do of 5 mm.

As shown in the FIG. 9. compared with the case when radius rm of the nearest position 36 of the flange portion 34 is rm=2 mm (Dm=4 mm), that is, when nearest position 36 is located in the middle between the outer circumferential side and the inner circumferential side (middle in the radial direction) of the disk-facing surface 35, the buoyancy is significantly higher when rm=1.6 mm Dm=3.2 m. That is, when the nearest position 36 is displaced form the outer circumferential side to the inner circumferential side of the disk-facing surface 35 ((D1+DO)/2>Dm).

With this configuration, the margin becomes larger with respect to the various types of tilts (tangential tilt, radial tilt, and shift tilt) generated between the optical disk 1 and the objective lens 10, and it is possible to reliably avoid the collision of the objective lens 10 on the optical disk 1.

Figure 10:
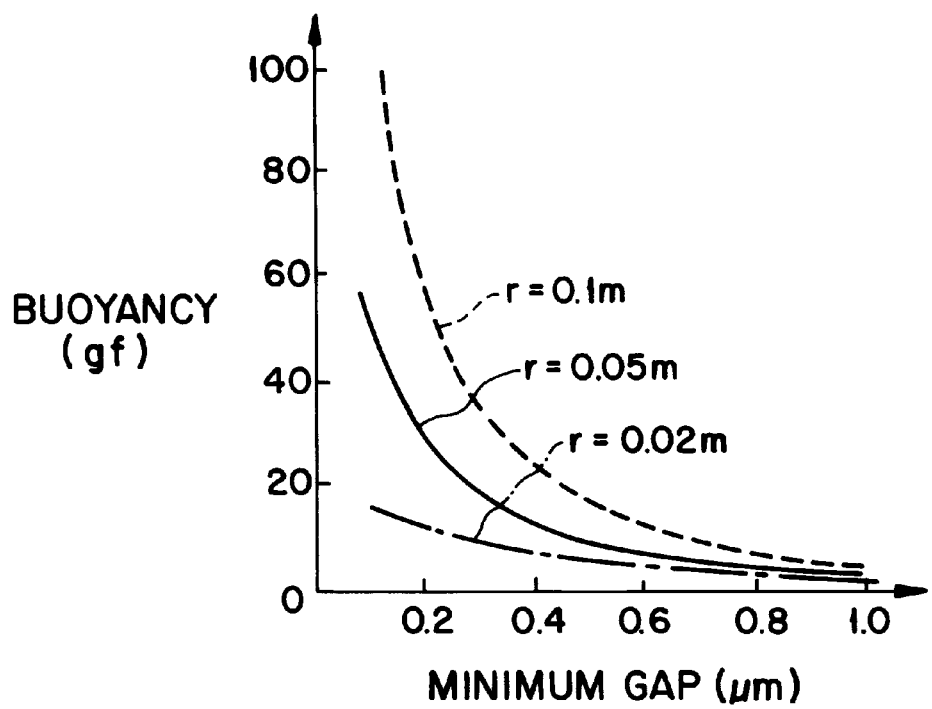
FIG. 10 is a diagram illustrating the relationship between the minimum gap between the surface of the flange portion facing the optical disk and the optical disk itself versus the buoyancy of the objective lens, with the radius of curvature of the position nearest the optical disk on the surface of the flange portion facing the optical disk taken as a parameter, for the objective lens in the second embodiment.

FIG. 10 illustrates the relationship of the minimum gap, between the optical disk 1 and the objective lens 10, and the buoyancy generated by the objective lens 10 with respect to the optical disk 1, with radius of curvature r of the disk-facing surface 35 of the flange portion 34 taken as a parameter.

As stated above, the mass of the movable portion containing the objective lens 10 is usually about 0.5 g. When the estimated maximum acceleration (usually 20 G) is applied on the objective lens 10, the buoyancy of the objective lens 10 that can overcome the maximum acceleration, becomes 10 gf. Also, the minimum gap between the optical disk and the objective lens depends on the surface roughness of the optical disk 1. As, stated above, maximum height of the surface roughness is about 0.3 µm. Therefore, in order to generate a buoyancy of 10 gf and overcome the maximum acceleration by the disk-facing surface 35 of the flange portion 34, r radius of curvature should be set to r>0.02 m as shown in FIG. 10.

In addition, for the optical disk 1 accompanied with rotation, a tilt in the circumferential direction (i.e., tangential tilt) and a tilt in the radial direction (i.e., radial tilt) usually takes place. The magnitude of these tilts are up to about 7 mrad for the DVDs. Also, when the optical head 7 moves in the radial direction (i.e., tracking direction) of the optical disk 1, or when the objective lens 10 moves in the focusing direction, a tilt shift tilt of up to about 2 mrad takes place on the optical axis of the objective lens 10. As such, an overall relative tilt of 9 mrad takes place between the optical disk 1 and the objective lens 10.

To address the relative tilt between the optical disk 1 and the objective lens 10, when the minimum gap between the optical disk 1 and the objective lens 10 is 0.3 µm and prevent the collision of the objective lens 10 and the optical disk I, the following measures should be taken.

Suppose that the width of the flange portion 34 of the objective lens 10 in the radial direction is B as shown in FIG. 7.

$$B/r = \sin \theta$$

Because θ<<1, sin θ is nearly equal to tan θ, and they are nearly equal to θ. Consequently the relationship becomes $$B/r > \theta = (9+\alpha) \text{mrad}$$

Here, α represents the margin. In consideration of the assembly precision of the optical head and the spindle motor that rotates optical disk, when the adjustment operation is carried out, it is necessary to ensure that the value of α is at least 1 mrad. Thus, the relationship becomes $$B/r > 10^{-2}$$

$$r < 100 \, B$$

Usually, since B is at most 5 mm, one has r<0.5 m, that is, the value of r should be selected smaller than 0.5 m (=500 mm).

In this embodiment, distance d in the optical axis direction between the position nearest the optical disk 1 of the disk-facing surface 32 and the nearest position 36 of the disk-facing surface 35 of the flange portion 34 is selected within the range of 5 µm<d<500 µm. Also, the nearest position 36 of the disk-facing surface 35 of the flange portion 34 is displaced from the outer circumferential side to the inner circumferential side of the disk-facing surface 35, the radius of curvature r of the disk-facing surface 35 of the flange portion 34 is selected within the range of 0.02 m<r<0.5 m. In this configuration, the disk-facing surface 35 functions as a dynamic-pressure generating surface for preventing collision between the optical disk 1 and the objective lens 10. By means of the disk-facing surface 35, a buoyancy overcoming the maximum acceleration is generated and, at the same time, collision of the objective lens 10 on the optical disk 1 can be prevented. The collision may be prevented even in the presence of the relative tilts between the optical disk 1 and the objective lens 10, such as a tangential tilt, radial tilt, and shift tilt.

In the aforementioned embodiments, the lens body and the flange portion are formed as an integrated body. However, it is also possible to form the flange portion from a material other than that of the lens body (such as plastics), followed by integrating it with the lens body to form the objective lens.

The present invention has been described in terms of preferred embodiments. The invention, however, is not limited to the embodiment depicted and described. Rather the scope of the invention is defined by the appended claims.

What is claimed is:

1. An objective lens for focusing a laser beam on an optical recording medium, comprising:

a first surface having a convex shape and facing toward the optical recording medium, said first surface configured to generate a dynamic pressure to prevent a collision with the optical recording medium when the objective lens approaches the optical recording medium; and a second surface disposed opposite to said first surface, said second surface having a convex shape to accommodate entry of the laser beam, wherein said dynamic pressure is caused by the convex shape of said first surface and a rotating movement of the optical recording medium.

2. An objective lens according to claim 1, wherein said convex shape of said first surface has a radius of curvature R such that:

$$0.2 \, \text{m} < R < 0.5 \, \text{m}.$$

3. An objective lens for focusing a laser beam on an optical recording medium comprising:

a lens portion for accommodating an entry of the laser beam; and a flange portion disposed on a periphery of said lens portion, said flange portion having a convex surface and adapted to be closer to the optical recording medium than said lens portion surface, wherein the convex surface of said flange portion is configured to generate a dynamic pressure in order to prevent a collision when the objective lens approaches a rotating optical recording medium.

4. An objective lens according to claim 3, wherein a distance d in an optical axis direction between a position nearest the optical recording medium on said lens portion facing the optical recording medium and a position nearest the optical recording medium on the convex surface of said flange portion facing the optical recording medium is selected from the range of 5 µm<d<500 µm.

5. An objective lens according to claim 3, wherein the position nearest the optical recording medium on the convex surface of said flange portion facing the optical recording medium is displaced from an outer circumferential side to an inner circumferential side of said flange portion.

6. An objective lens according to claim 3, wherein a radius of curvature r of the convex surface of said flange portion is selected from the range:

0.02 m<r<0.5 m.

7. A device for performing at least one of recording information onto and reproducing information from an optical recording medium, said device comprising:

a disk rotating motor for rotating the optical recording medium during recording and reproducing of information;

an optical lens for focusing a laser beam on an optical recording medium including, a first surface, having a convex shape and facing toward the optical recording medium, said first surface configured to generate a dynamic pressure to prevent a collision with the optical recording medium when the objective lens comes near the optical recording medium, said dynamic pressure caused by the shape of said first surface and a rotation of optical recording medium, and a second surface, disposed opposite to said first surface, having a convex shape to accommodate entry of the laser beam; and an optical lens driving means for moving said optical lens along an optical axis direction.

8. A device according to claim 7, wherein the convex shape of said first surface has a radius of curvature R wherein: 0.2 m<R<0.5 m.

9. A device for performing at least one of recording information onto and reproducing information from an optical recording medium, said device comprising:

a disk rotating motor for rotating the optical recording medium during recording and/or reproducing of information;

an optical lens for focusing a laser beam on an optical recording medium including,
a lens portion for accommodating an entry of a laser beam, and
a flange portion disposed on a periphery of said lens portion, said flange portion having a convex surface and being disposed closer to the optical recording medium than said lens portion; and an optical lens driving means for moving said optical lens along an optical axis direction, wherein the convex surface of said flange portion is configured to generate a dynamic pressure when said optical lens approaches the optical recording medium.

10. A device according to claim 9, wherein a distance d in an optical axis direction between a position nearest the optical recording medium on said lens portion facing the optical recording medium and a position nearest the optical recording medium on the convex surface of said flange portion facing the optical recording medium is selected from the range: 5 $\mu$m<d<5 $\mu$m.

11. A device according to claim 9, wherein the position nearest the optical recording medium on the convex surface of said flange portion facing the optical recording medium is displaced from an outer circumferential side to an inner circumferential said of said flange portion.

12. A device according to claim 9, wherein a radius of curvature r of the convex surface of said flange portion is selected from the range of:

0.02 m<r<0.5 m.

13. A device for performing at least one of writing information to and reading information from an optical medium, said device comprising:

means for moving the optical medium;
an objective lens having a surface which is configured to generate a dynamic pressure when the lens approaches a moving optical recording medium; and
means for controlling a relative position between said objective lens and the optical medium, said controlling means including means for positioning said objective lens so that the dynamic pressure generated by the surface of said objective lens to float on an air cushion between said objective lens and said moving optical recording medium.

14. The device according to claim 13, wherein the means for moving comprises a spindle motor.

15. The device according to claim 13, wherein the surface of said objective lens includes a convex shape having a radius of curvature between 0.2 m and 0.5 m.

16. The device according to claim 13, wherein the surface of said objective lens comprises an image portion and a flange portion surrounding said image portion, said flange portion being closer to the optical medium than said image portion.

17. The device according to claim 16, wherein the gap between said image portion and said flange portion is between 5 $\mu$m and 500 $\mu$m.

18. The device according to claim 17, wherein said flange portion includes a convex surface facing the optical medium, said convex surface having a radius of curvature of between 0.02 m and 0.5 m.

19. The device according to claim 13, wherein the medium is an optical disk.

20. An objective lens for focusing a laser beam on an optical recording medium, comprising:

a first surface facing toward the optical recording medium, said first surface having a shape configured to generate a dynamic pressure that prevents a collision between the objective lens and a rotating optical recording medium as the objective lens approaches said rotating optical recording medium; and a second surface disposed opposite to said first surface, said second surface having a convex shape to accommodate entry of the laser beam, wherein the objective lens is positioned so that there exists an unobstructed path along an optical axis direction as the objective lens approaches said rotating optical recording medium.

21. An objective lens according to claim 20, wherein said shape of said first surface of said objective lens includes a convex shape having a radius of curvature between 0.2 m and 0.5 m.

22. An objective lens according to claim 20, wherein said shape of said first surface of said objective lens comprises an image portion and a flange portion surrounding said image portion, said flange portion being closer to said rotating optical recording medium than said image portion.

23. The device according to claim 22, wherein the gap between said image portion and said flange portion is between 5 $\mu$m and 500 $\mu$m.

24. The device according to claim 23, wherein said flange portion includes a convex surface facing said rotating optical recording medium and having a radius of curvature of between 0.02 m and 0.5 m.

25. A device for performing at least one of writing information to and reading information from an optical medium, said device comprising:

means for rotating the optical medium; objective lens having a surface which is configured to generate a dynamic pressure when said objective lens approaches a rotating optical medium; and means for controlling a relative position between said objective lens and said rotating optical medium, said controlling means including means for positioning said objective lens so that the dynamic pressure generated by the surface of said objective lens to float on an air cushion between said objective lens and said rotating optical medium, wherein said objective lens is positioned so that there exists an unobstructed path along an optical axis direction as said objective lens approaches said rotating optical medium.

26. The device according to claim 25, wherein said means for rotating comprises a spindle motor.

27. The device according to claim 25, wherein said surface of said objective lens includes a convex shape having a radius of curvature between 0.2 m and 0.5 m.

28. The device according to claim 25, wherein said surface of said objective lens comprises an image portion and a flange portion surrounding said image portion, said flange portion being closer to said rotating optical medium than said image portion.

29. The device according to claim 28, wherein the gap between said image portion and said flange portion is between 5 $\mu$m and 500 $\mu$m.

30. The device according to claim 29, wherein said flange portion includes a convex surface facing said rotating optical medium and having a radius of curvature of between 0.02 m and 0.5 m.

* * * * *